(Model.)
P. E. JAY.
PUMP.
No. 247,360. Patented Sept. 20, 1881.
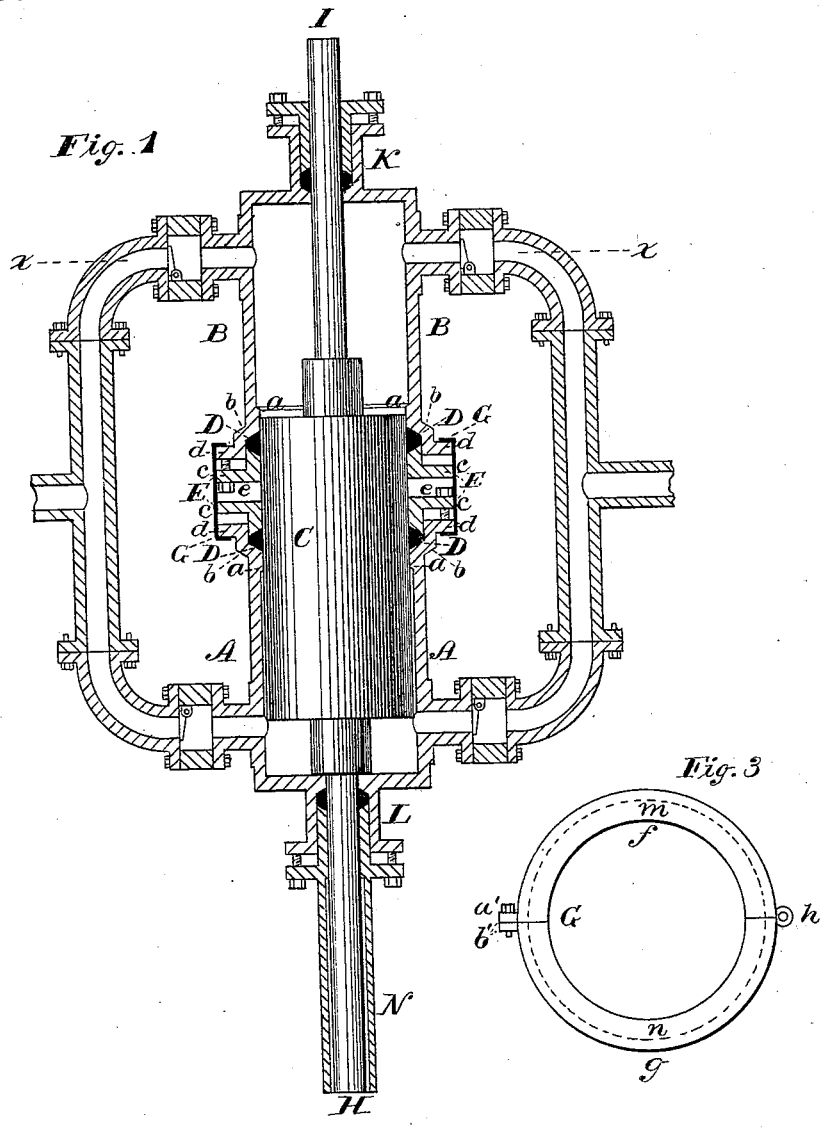
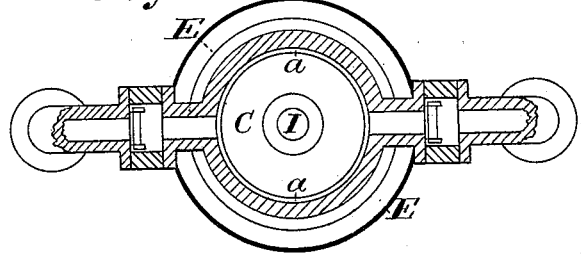
Witnesses
Robert W. Matthews
Thomas E. Crossman
Inventor
Pierre Eymard Jay
per James A. Whitney
att'y

UNITED STATES PATENT OFFICE.

PIERRE E. JAY, OF NEW YORK, N. Y.

PUMP.

SPECIFICATION forming part of Letters Patent No. 247,360, dated September 20, 1881.

Application filed March 21, 1881. (Model.)

*To all whom it may concern:*

Be it known that I, PIERRE EYMARD JAY, of the city, county, and State of New York, have invented certain Improvements in Pumps, of which the following is a specification.

This invention is designed to insure easy access to the packings of pump-cylinders, and also to prevent the undue wear or grinding of the packing from contact of dust, grit, &c. To this end the invention consists in certain novel combinations of parts calculated to insure the object sought.

Figure 1 is a vertical longitudinal sectional view of an apparatus embracing my said invention. Fig. 2 is a horizontal sectional view thereof, taken in the line $x\ x$ of Fig. 1; and Fig. 3 is a detail view of one part of said apparatus.

A and B are two pump-cylinders, placed in line with each other, but at a distance apart sufficient to permit access to the interior of the innermost end portion of each when the glands are removed. The inner surface of the inner end portion of each of the cylinders A B is provided with an inwardly-projecting rib or bearing, $a$, which bears against the adjacent cylindric surface of the plunger C in such manner as to prevent the said plunger from coming in contact with the main length of the interior of the cylinder. This bearing $a$, moreover, is only that of comparatively light contact, the said bearing also serving to aid in supporting the packing D, which is placed within the annular chambers provided by the offset portions $b$ at the inner end of each cylinder. The bottom of each of these chambers is sloping or inclined, as shown in Fig. 1, and in each of said chambers is placed a ring or annulus, E, the inner edge of which is also sloping, but in a direction opposite that of the bottoms of the chambers. The rings press upon the packing, and the latter, acted upon by the opposing inclined surfaces, is crowded or compressed around the plunger to the required degree. The rings E are provided with peripherical flanges $c$, which coincide in position with similar flanges, $d$, on the inner extremities of the cylinders. The flanges $c$ are bolted to the flanges $d$ by bolts and nuts $e$, so that by tightening the bolts the rings may be drawn inward to compress the packing to any requisite degree. The packing may be of any usual or suitable kind. By removing the rings access is readily provided to the packing, or to the chambers in which said packing is placed, so that the packing may be readily removed, adjusted, or replaced, as the case may be. Furthermore, as the bearings $a$ approach so closely to the plunger it follows that the packing is supported practically to its point of contact with said plunger, and the uniform pressure and contact of the packing upon the plunger is secured.

In order to prevent dust, grit, &c., from finding its way to the packing, (which would result in grinding or cutting the surface of the plunger,) there is combined with the inner end portions of the cylinders, their packing D, and rings E a circular jacket, G, formed in two semicircular halves or sections, $f\ g$, as shown in Fig. 3, the two halves being hinged together at one side, as represented at $h$, and being connected at the other by bolts $a'$ passing through studs or flanges $b'$ formed on the free ends of said halves $f\ g$. The said jacket is provided at top and bottom with inwardly-projecting circumferential flanges $m\ n$, which pass upon the flanges $d$ of the cylinders, as represented in Fig. 1, when the jacket is applied in place. The jacket being placed around the inner end portions and their adjuncts of the two cylinders, the free ends of said jacket are fastened together, as hereinbefore indicated, and the jacket thus incloses the said inner end portions of the cylinders and the packing devices in such manner as to effectually exclude all dust, grit, &c., therefrom.

The plunger C, as shown in Fig. 1, is common to both cylinders, the latter being fixed, and having their packing devices accessible by virtue of the space between them. The plunger has at each end an axial piston-rod. One of these, H, serves as a guide merely, to act in conjunction with the other, I, to afford axial support to the plunger to prevent it from pressing too hard in a lateral direction against the bearings $a$ or against the packing. Where the rod I passes through the head of its adjacent cylinder, B, it is packed by a suitable stuffing-box, K. In like manner the opposite rod, H, is packed by a suitable stuffing-box, L, where it passes through the head of the cylinder A; but in addition to this there is provided to the outwardly-extending end of the rod H a stationary sleeve, N, which is affixed to the head of the cylinder, and which, surrounding the said projecting portion of the said rod, effectually prevents the admission of dust, grit, &c., to the adjacent stuffing-box, the sleeve being closely but not tightly fitted to said rod. The inlet and outlet ports, pipes, and connections have substantially the same relation to the opposite outer end portions of the two coincident cylinders as they ordinarily have to the two opposite ends of an ordinary pump-barrel, and, being clearly shown in the drawings, Fig. 1, require no detailed description here. The two cylinders being of substantially the same capacity, the quantity pumped by each is substantially the same as by the other, and a very effective and uniformly-operating pump is secured.

What I claim as my invention is—

1. The two axially-coincident barrels A B, each constructed with an offset, b, and flange d, and each provided with its own packing D, gland E, and bolts e, and arranged with a space between them sufficient to permit access to their interiors, in combination with suitable pipes connecting said cylinders and a piston common to both, the whole constructed and combined for joint use and operation, substantially as and for the purpose herein set forth.

2. The combination of the divided or sectional jacket with the inner ends of the two separated and axially coincident cylinders A and B, provided with packing and compressing rings or glands, all substantially as and for the purpose herein set forth.

PIERRE EYMARD JAY.

Witnesses:
ROBERT W. MATTHEWS,
THOMAS E. CROSSMAN.